US009013396B2

(12) United States Patent
Lewis et al.

(10) Patent No.: US 9,013,396 B2
(45) Date of Patent: Apr. 21, 2015

(54) SYSTEM AND METHOD FOR CONTROLLING A VIRTUAL REALITY ENVIRONMENT BY AN ACTOR IN THE VIRTUAL REALITY ENVIRONMENT

(75) Inventors: George Steven Lewis, Alvarado, TX (US); John Valentino, Hurst, TX (US); Christopher Michael Bothwell, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 843 days.

(21) Appl. No.: 12/522,568

(22) PCT Filed: Jan. 22, 2008

(86) PCT No.: PCT/US2008/051642
§ 371 (c)(1),
(2), (4) Date: Jul. 9, 2009

(87) PCT Pub. No.: WO2008/091857
PCT Pub. Date: Jul. 31, 2008

(65) Prior Publication Data
US 2010/0039377 A1 Feb. 18, 2010

Related U.S. Application Data

(60) Provisional application No. 60/886,046, filed on Jan. 22, 2007.

(51) Int. Cl.
G09G 5/00 (2006.01)
G06F 3/0481 (2013.01)
G06F 3/01 (2006.01)

(52) U.S. Cl.
CPC ............ *G06F 3/04815* (2013.01); *G06F 3/012* (2013.01); *G06F 3/014* (2013.01)

(58) Field of Classification Search
CPC ....... G06F 3/011; G06F 3/017; G06F 3/0346; G06F 3/012; G06F 3/005; G06F 3/0425; G06F 3/014; G06F 3/0488; G06F 3/038; G06F 1/1626; G06F 3/013; G06F 19/3406; G06F 19/3418; G06F 19/36; G09B 15/023; G09B 15/002; G09B 19/0092; G09B 19/0038; G09B 23/28; G09B 23/285; G09B 9/006
USPC ........... 347/156, 8, 9; 345/156, 8, 9, 169, 1, 7
See application file for complete search history.

(56) References Cited

U.S. PATENT DOCUMENTS 5,999,185 A * 12/1999 Kato et al. .................... 345/420
6,308,565 B1 10/2001 French
(Continued)

FOREIGN PATENT DOCUMENTS

GB 2385238 A 8/2003
WO 02/19310 A1 3/2002
(Continued)

OTHER PUBLICATIONS

International Preliminary Examination Report in PCT Application PCT/US08/51651, dated Jul. 6, 2009, 7 pages.
(Continued)

*Primary Examiner* — Duc Dinh
(74) *Attorney, Agent, or Firm* — James E. Walton; Damon R. Hickman

(57) ABSTRACT

A motion capture environment includes at least one sensor-tracker for tracking a location of a tracked object within the motion capture environment and one or more computers collectively operable to generate a virtual reality environment including a virtual control panel having a virtual control that, when actuated, effects a predetermined result in the virtual reality environment; determine a virtual location of the tracked object within the virtual reality environment; and determine when the virtual location of the tracked object coincides with the location of the virtual control to actuate the virtual control. The motion capture environment further includes a display device for displaying the virtual reality environment to an actor within the motion capture environment.

22 Claims, 2 Drawing Sheets

(56) References Cited

U.S. PATENT DOCUMENTS

| | | | |
|---|---|---|---|
| 6,538,655 | B1 | 3/2003 | Kubota |
| 6,624,853 | B1 | 9/2003 | Latypov |
| 6,681,629 | B2 | 1/2004 | Foxlin et al. |
| 6,798,407 | B1 | 9/2004 | Benman |
| 7,084,884 | B1 | 8/2006 | Nelson et al. |
| 7,372,463 | B2 | 5/2008 | Anand |
| 7,468,778 | B2 | 12/2008 | Thomas et al. |
| 7,885,732 | B2 | 2/2011 | Troy et al. |
| 7,937,253 | B2 | 5/2011 | Anast et al. |
| 7,952,594 | B2 * | 5/2011 | Morita et al. ............ 345/633 |
| 8,018,579 | B1 * | 9/2011 | Krah ........................ 356/4.01 |
| 8,241,118 | B2 | 8/2012 | Camhi |
| 2002/0010571 | A1 | 1/2002 | Daniel |
| 2002/0060648 | A1 | 5/2002 | Matsui et al. |
| 2002/0133264 | A1 | 9/2002 | Maiteh et al. |
| 2002/0145563 | A1 * | 10/2002 | Kane et al. ................ 342/442 |
| 2004/0080507 | A1 * | 4/2004 | Von Prittwitz ............ 345/419 |
| 2004/0104935 | A1 | 6/2004 | Williamson et al. |
| 2004/0113885 | A1 | 6/2004 | Genc et al. |
| 2005/0143172 | A1 | 6/2005 | Kurzweil |
| 2005/0166163 | A1 | 7/2005 | Chang et al. |
| 2005/0233865 | A1 | 10/2005 | Reiffel |
| 2006/0001650 | A1 | 1/2006 | Robbins et al. |
| 2006/0087509 | A1 | 4/2006 | Ebert et al. |
| 2006/0192852 | A1 | 8/2006 | Rosenthal et al. |
| 2006/0210045 | A1 | 9/2006 | Valliath |
| 2006/0228101 | A1 | 10/2006 | Sullivan et al. |
| 2006/0267932 | A1 | 11/2006 | Rosenberg et al. |
| 2006/0290695 | A1 | 12/2006 | Salomie et al. |
| 2007/0003915 | A1 | 1/2007 | Templeman |

FOREIGN PATENT DOCUMENTS

| | | | |
|---|---|---|---|
| WO | 0221451 | A1 | 3/2002 |
| WO | 2004044644 | A1 | 5/2004 |
| WO | 2005116939 | A1 | 8/2005 |

OTHER PUBLICATIONS

International Search Report and Written Opinion in Parent PCT Application PCT/US08/51642, dated Jun. 27, 2008, 7 pages.

International Preliminary Report on Patentability in Parent PCT Application PCT/US08/51642, dated Dec. 29, 2008, 7 pages.

International Search Report and Written Opinion in PCT Application PCT/US08/51661, dated Jul. 1, 2008, 6 pages.

International Preliminary Report on Patentability in PCT Application PCT/US08/51661, dated Dec. 29, 2008, 7 pages.

SpotON: An Indoor 3D Location Sensing Technology Based on RF Signal Strength, by Hightower et al., University of Washington Computer Science and Engineering Technical Report #2000-02-02, Feb. 18, 2000, 16 pages.

Office Action in U.S. Appl. No. 12/522,641, dated Dec. 6, 2011, 22 pages.

International Search Report and Written Opinion in PCT Application PCT/US08/60562, dated Aug. 15, 2008, 7 pages.

International Preliminary Report on Patentability in PCT Application PCT/US08/60562, dated Feb. 18, 2010, 7 pages.

Office Action in U.S. Appl. No. 12/522,620, dated Oct. 31, 2011, 9 pages.

Supplementary European Search Report in European Application No. 08713892, dated Sep. 29, 2010, 5 pages.

Office Action in U.S. Appl. No. 12/595,373, dated Feb. 17, 2012, 8 pages.

First Examination Report from the Canadian Intellectual Property Office in related Canadian Application No. 2,675,999, issued Jul. 5, 2012, 2 pages.

Office Action in U.S. Appl. No. 12/522,641, dated May 4, 2012, 23 pages.

Office Action in U.S. Appl. No. 12/522,641, dated Aug. 10, 2012, 24 pages.

Office Action in U.S. Appl. No. 12/522,620, dated Oct. 9, 2012, 17 pages.

Office Action in U.S. Appl. No. 12/522,620, dated Apr. 12, 2012, 17 pages.

Office Action in U.S. Appl. No. 12/595,373, dated Aug. 15, 2012, 10 pages.

Canadian Examination Report from the Canadian Intellectual Property Office in related Canadian Application No. 2,675,276, mailed Apr. 3, 2013, 4 pages.

Extended European Search Report from corresponding application 08713883.0-1245 issued by the European Patent Office dated Dec. 6, 2012, 7 pages.

First Examination Report from the Canadian Patent Office in related Canadian application 2,675,995, mailed May 2, 2013, 4 pages.

First Examination Report from the Canadian Patent Office in related Canadian application 2,684,487, mailed Apr. 24, 2013, 3 pages.

European Examination Report from related application 08713883.0 issued by the European Patent Office dated Sep. 16, 2013, 7 pages.

Extended European Search Report in related European patent application No. 08733207.8, mailed Jul. 2, 2013, 5 pages.

Extended European Search Report in related European patent application No. 08713901.0, mailed Jun. 28, 2013, 6 pages.

"Surround-Screen Projection-based Virtual Reality: The Design and Implementation of the CAVE", Carolina Cruz-Neira, Computer Graphics: Annual Conference Series, New York, NY No. 20th, Aug. 1, 1993, pp. 135-142, XP002660833.

Canadian Examination Report from the Canadian Intellectual Property Office in related Canadian Application No. 2,675,276, mailed Jan. 17, 2014, 3 pages.

Examination report dated May 29, 2014 from counterpart CA App. No. 2684487.

Summons to attend oral proceedings pursuant to Rule 115(1) EPC from the European Patent Office in related European Patent Application No. 08713883.0, mailed Apr. 7, 2014, 8 pages.

Office Action in U.S. Appl. No. 12/595,373 counterpart EP App. No. 08733207.8, dated Jul. 7, 2014 (family).

* cited by examiner

SYSTEM AND METHOD FOR CONTROLLING A VIRTUAL REALITY ENVIRONMENT BY AN ACTOR IN THE VIRTUAL REALITY ENVIRONMENT

TECHNICAL FIELD

The present invention relates to the control of virtual environments.

DESCRIPTION OF THE PRIOR ART

Virtual reality is a technology which allows a user or "actor" to interact with a computer-simulated environment, be it a real or imagined one. Most current virtual reality environments are primarily visual experiences, displayed either on a computer screen or through special stereoscopic displays. An actor can interact with a virtual reality environment or a virtual artifact within the virtual reality environment either through the use of standard input devices, such as a keyboard and mouse, or through multimodal devices, such as a wired glove.

One particular shortcoming of conventional virtual reality environments is that an operator, who is outside of the virtual environment, operates the virtual reality environment. The actor cannot control the virtual reality environment independently from the outside operator.

There are ways of controlling virtual reality environments well known in the art; however, considerable shortcomings remain.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
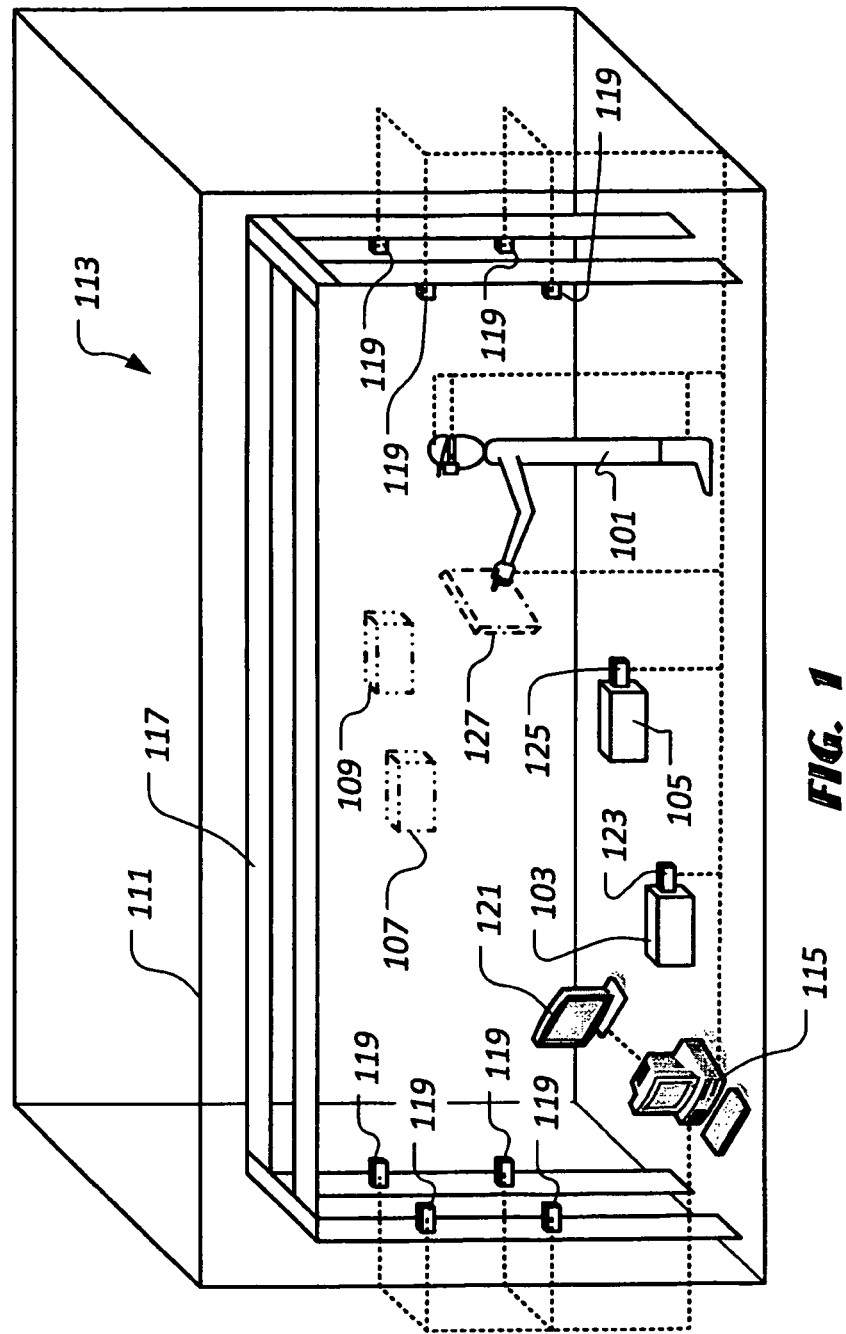
FIG. 1 is a stylized, exemplary, perspective view of an actor within a studio of a motion capture environment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIG. 1, in a virtual reality environment or virtual reality scene, one or more users or actors 101 interact with one or more physical objects 103 and/or 105 in a physical or real environment and/or one or more virtual artifacts 107 and/or 109 in the virtual reality environment. The one or more actors 101 are physically present in a three-dimensional space, known as a studio 111 in which the one or more actors 101 may move the one or more physical objects 103 and/or 105. A motion capture environment 113 is contained by studio 111. Motion capture environment 113 includes one or more computers 115 and software resident on the one or more computers 115 that are operable to generate virtual reality scenes. Motion capture environment 113 further includes a framework 117, upon which to mount tracker-sensors 119 and/or tracker-sensor combinations, which are described in greater detail herein. The software includes one or more computer programs that interpret information from the tracker-sensors and one or more computer programs that create the virtual reality scenes or environment.

A virtual representation of studio 111 exists in motion capture environment 113, which hosts the virtual reality environment. The one or more actors 101 use display devices, for example, headset viewers, such as a headset viewer 201 of FIG. 2; monitors, such as a monitor 121; or the like, to view the virtual reality environment. The virtual reality environment is the scene that the one or more actors 101, or other such observers, see via the display devices. The virtual reality environment may be a virtual representation of the studio or the virtual reality environment may be a virtual representation of any other real or imagined three dimensional space. Moreover, the virtual reality environment may be a combination of a virtual representation of the studio and a virtual representation of another real or imagined three-dimensional space.

Figure 2:
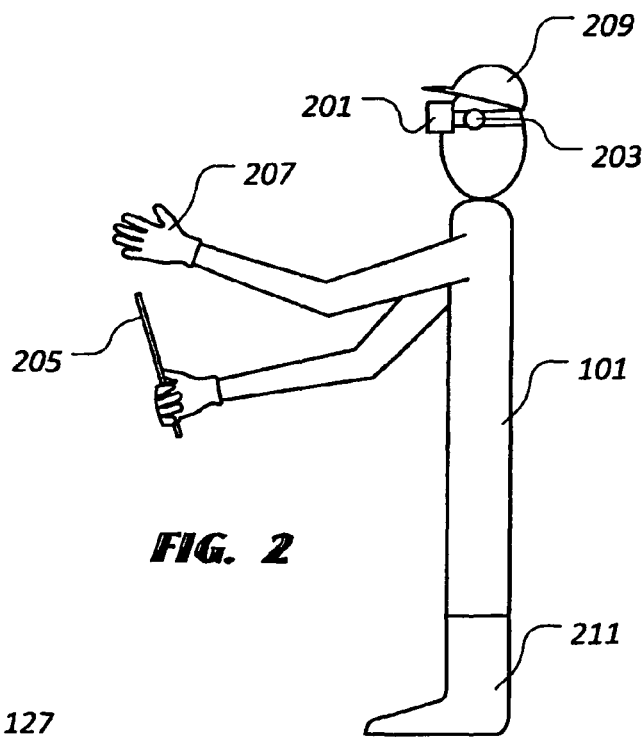
FIG. 2 is an enlarged view of the actor of FIG. 1.

Physical objects, such as physical objects 103 and 105, that are disposed within studio 111 and that are moved by the one or more actors 101, are tracked using motion capture environment 113. These "tracked objects" may be tracked by a variety of sensor methodologies, including, but not limited to, reflectors, such as reflectors 123 and 125 and reflector 203 of FIG. 2; inertial measurement units; and the like. Examples of such inertial measurement units include, but are not limited to, ring laser gyroscopes, accelerometers, ultrasonic emitter-receptors, and the like. Referring to FIG. 2, examples of tracked objects include, but are not limited to, wands, such as a wand 205; gloves, such as a glove 207; hats, such as a hat 209; head mounted displays, such as headset viewer 201; boots, such as boot 211; and the like.

Tracker-sensors, such as tracker sensors 119, interface with motion capture environment 113 and determine where a tracked object, such as physical objects 103 and 105, is located within the physical space of the studio. Such tracker-sensors may comprise a single unit or a plurality of units. The tracker-sensors may be attached to a framework, such as framework 117, which defines the physical limits of the studio or may be attached to the tracked objects, or both. While tracker-sensors may utilize various methodologies for tracking tracked objects, certain tracker-sensors use inertial acceleration with subsequent integration to provide rate and displacement information, ultrasonic measurement, optical measurement, near infrared measurement, as well as methods that use other bands of radiation within the electromagnetic spectrum.

Figure 3:
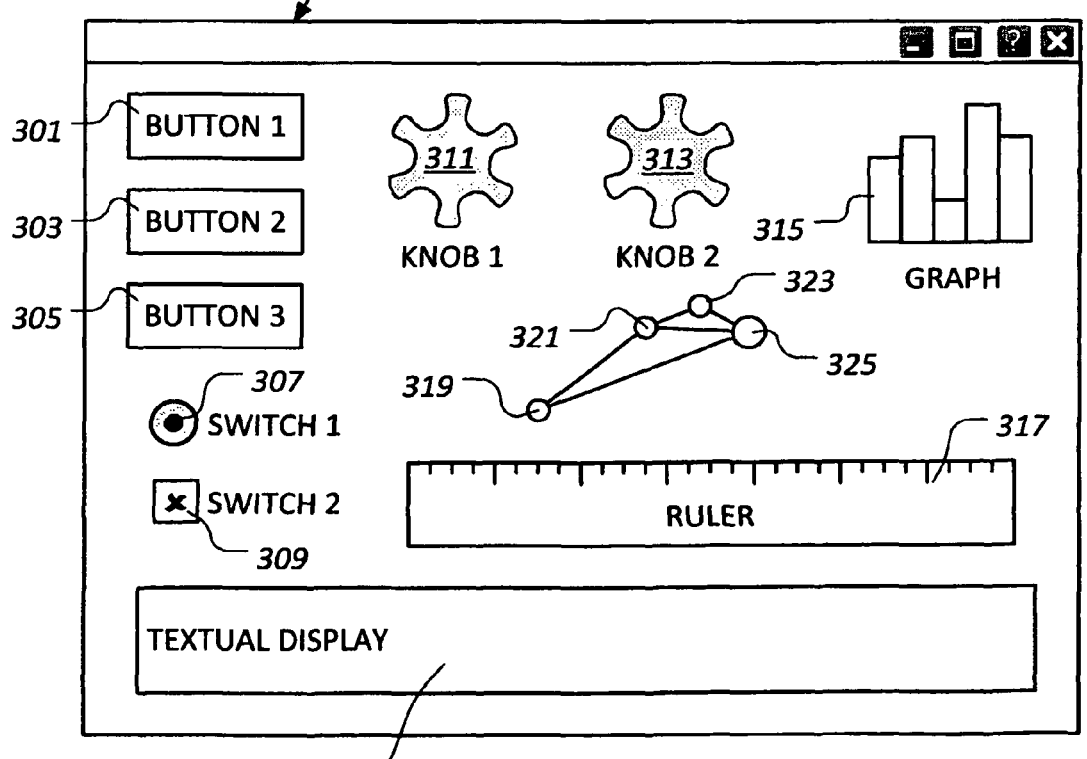
FIG. 3 is a stylized, exemplary view of a representation of a virtual control panel within a virtual reality environment.

Referring now to FIGS. 1 and 3, a virtual control panel, such as the displayed representation of a virtual control panel 127, also known as a synthetic remote control, exists as a virtual artifact only in the virtual reality environment and is produced by motion capture environment 113. Virtual control panel 127 is a virtual object displayed by the display device, such as headset viewer 201 of FIG. 2, used by actor 101 to see the virtual reality environment. Virtual control panel 127 may also be displayed on other display devices, such as monitor 121 of FIG. 1, that can be viewed by those that are not actors. In one embodiment, virtual control panel 127 is a virtual means for inputting information to motion capture environment 113 by actor 101. For example, as shown in FIG. 3, virtual control panel 127 comprises a plurality of controls that may be manipulated by actor 101. For example, in the embodiment illustrated in FIG. 3, the controls include, but are not limited to, buttons 301, 303, and 305; switches 307 and 309; and knobs 311 and 313, which may be manipulated by actor 101. It should be noted that virtual control panel 127 may include additional or alternative controls that may be manipulated by actor 101.

Moreover, virtual control panel 127 may include one or more means for providing information from motion capture environment 113 to actor 101. For example, virtual control panel 127 may provide information relating to a simulation being performed to actor 101, such as a color scale or graph 315 representing certain parameter levels or a textual display 316 providing other such information. Moreover, virtual control panel 127 may comprise other tools which can be utilized by actor 101 in the virtual reality environment. For example, virtual control panel 127 may provide a virtual ruler 317, which can be used by actor 101 to measure virtual artifacts, distances between virtual artifacts, or the like.

It should be noted that the virtual control panel is able to "float" in virtual space at a location specified by actor 101 and may be moved from one place in the virtual environment to another place in the virtual environment by actor 101. The controls may be manipulated by actor 101's virtual hand, defined by a glove, such as glove 207, best shown in FIG. 2. Representations or "markers" 319, 321, 323, and 325, corresponding to a reflector from a glove worn by actor 101, are also illustrated in FIG. 3. The manipulation of the control is detected by interpreting the motion of the actor's virtual hand when the actor's virtual hand is in "touching" proximity to the control, as determined by motion capture environment 113. Motion capture environment 113 determines how the control has been manipulated and reacts to the manipulation appropriately.

In one embodiment, actor 101 in studio 111 manipulates a virtual hand in the virtual reality environment by wearing and physically moving glove 207, best shown in FIG. 2, which is a tracked object. Motion capture environment 113 interprets the motion of the glove and determines where actor 101's virtual hand is located in the virtual reality environment and how the virtual hand is oriented. In this embodiment, actor 101 wears headset viewer 201, best shown in FIG. 2, that is equipped with a synthetic vision viewer. The synthetic vision viewer displays to actor 101 the virtual reality environment and the location of the virtual hand within the virtual reality environment. Thus, actor 101 can see the virtual hand in the context of the scene of the virtual reality environment.

In FIGS. 1 and 2, actor 101 is wearing headset viewer 201 and glove 107. Actor 101 is reaching into empty physical space to press a button, such as one of buttons 301, 303, or 305, of virtual control panel 127.

Virtual control panel 127 is preferably positioned at some starting location within the virtual reality environment or may be opened and displayed at any convenient location within the virtual reality environment when actor 101 issues a command "summoning" virtual control panel 127. Tracker-sensors 119 track the location of glove 207, best shown in FIG. 2, and, thus, the virtual hand in the virtual reality environment and compare the location of the virtual hand in the virtual reality environment to the locations of the virtual control panel's controls in the virtual reality environment. When a collision is detected between the virtual hand and a virtual control of virtual control panel 127, the virtual hand is deemed to be touching the control. Motion capture environment 113 responds to the motion of the virtual hand and a mapping of a control state to a desired action causes the desired action to occur, just as if a physical or real hand had manipulated a physical or real control. Actor 101 can operate a virtual control of virtual control panel 127 in the same way actor 101 can physically operate a tangible, physical object or control capable of being physically touched and physically manipulated. It should be noted that touching buttons, knobs, switches, and the like of the virtual control panel is but one way of interacting with the virtual control panel.

Virtual control panel 127 provides many advantages to a virtual reality experience. For example, virtual control panel 127 can be configured to operate motion capture environment 113 and, thus, the virtual reality environment. Actor 101 can operate the virtual reality environment from within the environment. An external observer or operator is not required to operate the virtual reality environment.

Moreover, virtual control panel 127 can grow and shrink in size and capability without limit. Furthermore, virtual control panel 127 can be made to disappear or reappear at the will of actor 101, without interfering with the scene in the virtual reality environment. Virtual control panel 127 is able to float at any location and orientation desired by actor 101.

It should be noted that motion capture environment 113 comprises one or more computers, such as computer 115, executing software embodied in a computer-readable medium that is operable to produce and control the virtual reality environment. The scope of the invention encompasses, among other things, motion capture environment, such as motion capture environment 113 of FIG. 1; the software operable to produce and control the virtual reality environment; and the method for producing and controlling the virtual reality environment, carried out by motion capture environment 113.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A motion capture environment, comprising:
a physical framework that defines physical limits of a virtually-represented studio within the motion capture environment;
a plurality of tracker-sensors mounted to the physical framework for tracking a location of a tracked object within the motion capture environment, the plurality of tracker-sensors including first and second tracker-sensors mounted at opposing physical limits of the studio;
at least one tracker-sensor mounted to the tracked object;
one or more computers collectively operable to:
generate a virtual reality environment within the physical framework, the virtual reality environment including a virtual control panel, the virtual control panel having a virtual control that, when actuated by an actor within the virtual reality environment, effects a predetermined result in the motion capture environment, the virtual control panel being a virtual artifact in the virtual reality environment configured to operate the virtual reality environment from within the virtual reality environment, the virtual control panel being manipulated by the actor to input information into the motion capture environment to control physical and virtual artifacts, the virtual control panel being configured to permit an actor within the virtual reality environment to operate the motion capture environment without an external operator;
determine a virtual location of the tracked object within the virtual reality environment; and
determine when the virtual location of the tracked object coincides with the location of the virtual control to actuate the virtual control; and
a display device for displaying the virtual reality environment to the actor within the motion capture environment.

2. The motion capture environment, according to claim 1, wherein the one or more computers are collectively operable to provide information to the actor via the virtual control panel.

3. The motion capture environment, according to claim 2, wherein the information concerns a computer-generated simulation.

4. The motion capture environment, according to claim 2, wherein the information is textual.

5. The motion capture environment, according to claim 2, wherein the information is graphical.

6. The motion capture environment, according to claim 1, wherein the virtual control is a virtual button.

7. The motion capture environment, according to claim 1, wherein the virtual control is a virtual knob.

8. The motion capture environment, according to claim 1, wherein the virtual control is a virtual switch.

9. The motion capture environment, according to claim 1, wherein the one or more computers are collectively operable to generate a virtual ruler for measuring distances in the virtual reality environment.

10. The motion capture environment, according to claim 1, wherein the tracked object is attachable to the actor.

11. The motion capture environment, according to claim 1, wherein the tracked object is a portion of a glove.

12. A method for controlling a motion capture environment operable to generate a virtual reality environment by an actor in the virtual reality environment, the method comprising:
providing a physical framework that defines physical limits of a virtually-represented studio within the motion capture environment;
providing a plurality of tracker-sensors mounted to the physical framework for tracking a location of a tracked object within the motion capture environment, the plurality of tracker-sensors including first and second tracker-sensors mounted at opposing physical limits of the studio;
providing at least one tracker-sensor mounted to the tracked object;
generating a virtual reality within the physical framework, the virtual reality environment including a virtual control panel, the virtual control panel having a virtual control that, when actuated by the actor within the virtual reality environment, effects a predetermined result in the motion capture environment, the virtual control panel being a virtual artifact in the virtual reality environment configured to operate the virtual reality environment from within the virtual reality environment, the virtual control panel being manipulated by the actor to input information into the motion capture environment to control physical and virtual artifacts, the virtual control panel being configured to permit an actor within the virtual reality environment to operate the motion capture environment without an external operator;
displaying the virtual reality environment to the actor participating in the virtual reality environment;
determining a virtual location of a tracked object within the virtual reality environment; and
determining when the virtual location of the tracked object coincides with the location of the virtual control to actuate the virtual control.

13. The method, according to claim 12, further comprising:
providing information to the actor via the virtual control panel.

14. The method, according to claim 13, wherein the information concerns a computer-generated simulation.

15. The method, according to claim 13, wherein providing information to the actor is accomplished by providing textual information to the actor.

16. The method, according to claim 13, wherein providing information to the actor is accomplished by providing graphical information to the actor.

17. The method, according to claim 12, wherein the virtual control is a virtual button.

18. The method, according to claim 12, wherein the virtual control is a virtual knob.

19. The method, according to claim 12, wherein the virtual control is a virtual switch.

20. The method, according to claim 12, further comprising:
generating a virtual ruler for measuring distances in the virtual reality environment.

21. The method, according to claim 12, wherein determining the virtual location of the tracked object within the virtual reality environment is accomplished by tracking an object operably associated with the actor.

22. The method, according to claim 12, wherein the object operably associated with the actor is a portion of a glove.

\* \* \* \* \*